United States Patent [19]
Akiyama et al.

[11] Patent Number: 4,987,186
[45] Date of Patent: Jan. 22, 1991

[54] PRESSURE SENSITIVE ADHESIVE COMPOSITION

[75] Inventors: Mamoru Akiyama, Ibaraki; Takeshi Matsuyama, Takatsuki; Yoshiyuki Yanagida, Ibaraki; Akira Yamashita, Ohmihachiman, all of Japan

[73] Assignee: Nippon Gohsei Kagaku Kogyo Kabushiki Kaisha, Osaka, Japan

[21] Appl. No.: 287,308

[22] Filed: Dec. 21, 1988

[30] Foreign Application Priority Data

Dec. 29, 1987 [JP] Japan ................................ 62-336190

[51] Int. Cl.$^5$ .............................................. C08F 8/42
[52] U.S. Cl. .................................... 525/107; 525/119; 525/123; 525/328.6; 525/329.5; 525/344; 525/366; 525/367; 525/368; 525/369; 525/370; 525/371; 525/372; 525/376; 525/379; 525/381; 525/382; 525/383; 525/385
[58] Field of Search ................... 525/328.6, 329.5, 107, 525/119, 123, 344, 366, 367, 368, 369, 370, 371, 372, 376, 379, 381, 382, 383, 385

[56] References Cited

FOREIGN PATENT DOCUMENTS 59-50166 12/1984 Japan .

Primary Examiner—Bernard Lipman
Attorney, Agent, or Firm—Armstrong, Nikaido, Marmelstein, Kubovcik & Murray

[57] ABSTRACT

This invention provides a pressure sensitive adhesive composition comprising an acrylic copolymer component (A) which is at least in part an acetoacetyl group-containing acrylic copolymer and at least one curing component (B) selected from the class consisting of isocyanate compounds, epoxy compounds, aldehyde compounds, non-amino resin amine compounds, metal salts, metal alkoxides, metal chelate compounds, ammonium salts and hydrazine compounds.

This adhesive composition is well-balanced in the triad of tack, adhesion, cohesion in adhesion technology and can be advantageously used in various applications such as adhesive tapes and labels.

6 Claims, No Drawings

PRESSURE SENSITIVE ADHESIVE COMPOSITION

BACKGROUND OF THE INVENTION

The present invention relates to a pressure sensitive adhesive composition based on an acrylic copolymer which is at least in part an acetoacetyl group-containing acrylic copolymer.

Pressure sensitive adhesives have heretofore been used in various fields of application, in such varied forms as the adhesive tape, two-sided adhesive tape, adhesive label or sticker, adhesive sheet and so on.

Particularly, pressure sensitive adhesives of acrylic copolvmer type have been used in an extended spectrum of application by virtue of their unexcelled weather resistance.

Among the acrylic copolymers in common use for pressure sensitive adhesives are those copolymers which can be produced by the copolymerization of, as a major component unit, a monomer having a low glass transition temperature such as an alkyl acrylate having about 2 to 12 carbon atoms in the alkyl moiety or an alkyl methacrylate having about 4 to 12 carbon atoms in the alkyl moiety and, as a minor component unit, a monomer having a comparatively high glass transition point such as methyl acrylate, an alkyl methacrylate having 1 to 3 carbon atoms in the alkyl moiety, vinyl acetate, acrylonitrile, methacrylonitrile, styrene or the like, and/or a functional group-containing monomer such as acrylic acid, methacrylic acid, itaconic acid, maleic anhydride, a hydroxyalkyl methacrylate, dimethylaminoethyl methacrylate, acrylamide, methacrylamide, methylolacrylamide, glycidyl methacrylate and so on. Regarding said functional group-containing monomer, it is generally acknowledged that when acrylic acid is used in the copolymerization reaction, treatment of the copolymer with a small amount of a crosslinking agent such as an inocyanate compound, a metal chelate compound, an amino resin or an epoxy resin results in improvements in cohesive strength and heat resistance.

The specification of Japanese Patent Publication No. 50166/1984, my copending application, describes a resin composition comprising a copolymer containing, at least in part, an acetoacetyl group-containing ethylenically unsaturated monomer unit and an amino resin. This literature is mainly directed to a coating composition but mentions that the same composition can be used as an adhesive (pressure sensitive adhesive) as well (Example 14).

However, the acrylic copolymer-based pressure sensitive adhesives heretofore in common use are lacking in the balance of three cardinal qualities of adhesivity, namely tack, adhesion and cohesion, and have room for improvement. On the other hand, when a carboxyl group-containing monomer such as acrylic acid is used in the copolymerization reaction, the resulting resin composition tends to cause corrosion of metal, if such is the adherend.

The pressure sensitive adhesive disclosed in Japanese Patent Publication No. 50166/1984 has generally the disadvantage of a short pot life when an amino resin is added and provides only an insufficient keying or anchor strength when the substrate is a polyester film.

It is a primary object of the present invention to provide a pressure sensitive adhesive composition which is not only well-balanced in the aforementioned triad of adhesivity but has a sufficient keying strength and is conducive to a long pot life after addition of a curing agent.

SUMMARY OF THE INVENTION

The pressure sensitive adhesive composition of the present invention comprises an acrylic copolymer (A) which is at least in part an acetoacetyl group-containing acrylic copolymer and at least one curing component (B) selected from the group consisting of isocyanate compounds, epoxy compounds, aldehyde compounds, non-amino resin amine compounds, metal salts, metal alkoxides, metal chelate compounds, ammonium salts and hydrazine compounds.

DETAILED DESCRIPTION OF THE INVENTION

The present invention is hereinafter described in detail.

Acrylic Copolymer (A)

In accordance with the present invention, an acrylic copolymer (A) which is at least in part an acetoacetyl group-containing acrylic copolymer is used as a major component.

The acetoacetyl group-containing acrylic copolymer is preferably an acrylic copolymer containing 0.01 to 40 weight percent of acetoacetyl groups but the proportion of such acetoacetyl groups relative to the whole acrylic copolymer (A) is preferably in the range of 0.01 to 20 weight percent. This is because the presence of acetoacetyl groups in a greater or lesser proportion results in loss of the balance among said three cardinal qualities of adhesivity.

Therefore, when an acrylic polymer other than said acetoacetyl group-containing copolymer is employed in combination, its relative amount should be selected in view of the above quantitative requirement as to the acetoacetyl group content of the whole acrylic copolymer component (A). Generally, said other acrylic copolymer is used in an amount not less than 10 weight percent and preferably not less than 20 weight percent based on the whole acrylic copolymer component (A).

The acetoacetyl group-containing acrylic copolymer mentioned above can be produced by the following alternative processes.

(i) An acetoacetyl group-containing ethylenically unsaturated monomer is prepared in the first place and this monomer is then copolymerized with another acrylic monomer.

In this method, the acetoacetyl group-containing ethylenically unsaturated monomer can be prepared for example by the following process.

(i)-1 A functional group-containing ethylenically unsaturated monomer is reacted with diketene.

(i)-2 This monomer is subjected to transesterification with an acetoacetic ester compound.

As examples of the functional group referred to in (i)-1, there may be mentioned hydroxy, amido, urethane, amino, carboxy and so on. Preferred species of such functional group-containing ethylenically unsaturated monomer include 2-hydroxyethyl acrylate, 2-hydroxyethyl methacrylate, hydroxypropyl acrylate, hydroxypropyl methacrylate, 2-hydroxy-3-chloropropyl acrylate and so on.

(ii) An acrylic copolymer containing said functional group-containing ethylenically unsaturated monomer unit as a constituent unit is reacted with diketene.

This reaction can be carried out by adding diketene to the copolymer in solution and heating the mixture with stirring.

(iii) An acrylic copolymer containing as a constituent unit an ethylenically unsaturated monomer unit containing a functional group (hydroxy or ester group) which is capable of transesterification with an acetoacetic ester group is subjected to transesterification reaction with an acetoacetic ester compound.

(iv) An acrylic copolymer and an acetoacetyl group-containing ethylenically unsaturated monomer are subjected to graft-polymerization or mix-polymerization.

The reaction with diketene in (i)-1 or (ii) can be carried out in the absence of a catalyst or in the presence of a suitable catalyst such as a tertiary amine, an acid (e.g. sulfuric acid), a basic salt (e.g. sodium acetate) or an organometallic compound (e.g dibutyltin laurate).

The reaction with an acetoacetic ester compound in (i)-2 or (iii) is preferably conducted in the presence of a transesterification catalyst such as calcium acetate, zinc acetate, lead oxide or the like.

Of the above acetoacetylation processes, the processes described in (i) and (ii) are preferable for commercial production.

Since the acrylic copolymer component (A) which is at least in part an acetoacetyl group-containing acrylic copolymer is used as a major component of the pressure sensitive adhesive composition of the invention, the part other than said acetoacetyl group-containing copolymer is preferably of the same composition as the usual acrylic copolymer pressure sensitive adhesive, namely a soft major monomer segment having a low glass transition temperature, a hard comonomer segment having a high glass transition temperature and assuring adhesion and cohesive strength and further as necessary a minor amount of a functional group-containing monomer segment.

Thus, as the major monomer segment, there may be mentioned alkyl acrylates containing about 2 to 12 carbon atoms in the alkyl moiety and alkyl methacrylates containing about 4 to 12 carbon atoms in the alkyl moiety. As examples of said comonomer segment, there may be mentioned methyl acrylate, alkyl methacrylates containing 1 to 3 carbon atoms in the alkyl moiety, vinyl acetate, acrylonitrile, methacrylonitrile, styrene and so on. As examples of said functional group-containing monomer segment, there may be mentioned acrylic acid, methacrylic acid, crotonic acid, itaconic acid (or its anhydride), maleic acid (or its anhydride), fumaric acid, hydroxyethyl acrylate, hydroxyethyl methacrylate, hydroxypropyl acrylate, hydroxypropyl methacrylate, dimethylaminoethyl methacrylate, acrylamide, methacrylamide, methylolacrylamide, glycidyl methacrylate and so on.

Curing Component (B)

The heat sensitive adhesive composition of the present invention contains, in addition to the above acrylic copolymer component (A), a curing component (B) which is at least one member selected from the class consisting of isocyanate compounds, epoxy compounds, aldehyde compounds, non-amino resin amine compounds, metal salts, metal alkoxides, metal chelate compounds, ammonium salts and hydrazine compounds.

As exemplary species of the isocyanate compounds which can be used as said curing component (B), there may be mentioned tolylene diisocyanate, hydrogenated tolylene diisocyanate, trimethylolpropane-tolylene diisocyanate adduct, trimethylolpropane-xylylene diisocyanate adduct, triphenylmethane triisocyanate, methylenebis-(4-phenylmethane) triisocyanate, isophorone diisocyanate, etc. and the corresponding ketoxime-blocked or phenol-blocked compounds.

The epoxy compounds mentioned above include, among others, bisphenol A-epichlorohydrin epoxy resin, ethylene glycol diglycidyl ether, polyethylene glycol diglycidyl ether, glycerin di- or tri-glycidyl ether, 1,6-hexanediol diglycidyl ether, trimethylolpropane triglycidyl ether, diglycidylaniline, diglycidylamine, N,N,N',N'-tetraglycidyl m-xylenediamine, 1,3-bis(N,N'-diglycidylaminomethyl) cyclohexane and so on.

The aldehyde compounds include, among others, glyoxal, malondialdehyde, succindialdehyde, maleindialdehyde, glutardialdehyde, formaldehyde, acetaldehyde, benzaldehyde and so on.

The non-amino resin amine compounds include, among others, hexamethylenediamine, triethylenediamine, polyethyleneimine, hexamethylenetetramine, diethylenetriamine, triethylenetetramine, isophoronediamine and so on.

The metal salts include, among others, the chlorides, bromides, nitrates, sulfates, acetates and other salts of polyvalent metals such as aluminum, iron, copper, zinc, tin, titanium, nickel, antimony, magnesium, vanadium, chromium, zirconium, etc. and specifically include, among others, cupric chloride, aluminum chloride, ferric chloride, stannic chloride, zinc chloride, nickel chloride, magnesium chloride, aluminum sulfate, copper acetate, chromium acetate and so on.

The metal alloxides include, among others, tetraethyl titanate, tetraethyl zirconate, aluminum isopropionate and so on.

The metal chelate compounds include, among others, the coordination compounds of polyvalent metals, such as aluminum, iron, copper, zinc, tin, titanium, nickel, antimony, magnesium, vanadium, chromium, zirconium, etc. with acetylacetone or acetoacetic esters.

The ammonium salts include, among others, ammonium chloride, ammonium sulfate, ammonium acetate, ammonium propionate and so on.

The hydrazine compounds include, among others, hydrazine, hydrazine hydrate, and their inorganic salts such as hydrochlorides, sulfates, phosphates, etc., and salts of organic acids such as formic acid, oxalic acid and so on.

Proportions

In the pressure sensitive adhesive composition of the present invention, the proportion of curing component (B) relative to acrylic copolymer component (A) may vary according to the kind of curing agent but generally ranges from 0.001 to 10 weight percent and preferably in the range of 0.01 to 5 weight percent on many occasions.

Uses

The pressure sensitive adhesive composition of the present invention can be used with advantage in such applications as the packaging adhesive tape, office adhesive tape, medical adhesive, electrical insulation tape, masking tape or sheet, adhesive label or sticker, two-sided adhesive tape, special adhesive tape and so on.

OPERATION AND EFFECT OF THE INVENTION

In accordance with the present invention, the acetoacetyl group introduced into the acrylic copolymer is utilized as a functional group and a curing agent commensurate with the functional group is selected and incorporated.

For this reason, the pressure sensitive adhesive composition of the invention is well-balanced in regard to the three cardinal qualities of adhesivity, namely tack, adhesion and cohesion. Moreover, the keying property with respect to polyester film is also excellent. In addition, the cohesive strength under high temperature conditions is also satisfactory.

Furthermore, since the pot life after addition of the curing agent is long, the workability is improved and the cleaning of the application device is facilitated.

Moreover, in cases in which an unsaturated carboxylic acid monomer is incorporated as a cross-linkable function in acrylic copolymer (A) to achieve an improved cohesive strength upon addition of the curing agent, the required amount of the carboxylic acid can be minimized due to the presence of acetoacetyl groups in the molecule, so that the corrosive effect on metals can be prevented. This means that there is no limitation on the type of substrate or adherend.

EXAMPLES

The following examples are further illustrative of the present invention. In the following description, all parts and % are by weight unless otherwise indicated.

EXAMPLES 1 to 12 AND COMPARATIVE EXAMPLES 1 to 5

Synthesis of Acetoacetylated 2-Hydroxyethyl Methacrylate

A four-necked round-bottomed flask fitted with a reflux condenser, stirrer, drip funnel and thermometer was charged with 150 parts of 2-hydroxyethyl methacrylate, followed by addition of 0.05 part of triethylenediamine as a catalyst for diketene addition reaction. After the temperature was increased to 60° C., 96.9 parts (equivalent to 2-hydroxyethyl methacrylate) of diketene was added dropwise over a period of 2 hours with constant stirring. The reaction was further conducted for 5 hours to acetoacetylate the hydroxyl group of 2-hydroxyethyl acrylate.

The above procedure gave acetoacetylated 2-hydroxyethyl methacrylate, in which all the available hydroxyl groups in the charge had been acetoacetylated.

Synthesis of Acrylic Copolymer (A)

In the manner described below, acetoacetyl group-containing acrylic copolymers (A-1), (A-2) and (A-3), an acrylic acid-containing acrylic copolymer (A-4) and a maleic anhydride-containing acrylic copolymer (A-5) were synthesized.

(A-1)

A four-necked round-bottomed flask fitted with a reflux condenser, stirrer, drip funnel and thermometer was charged with 50 parts of butyl acrylate, 37 parts of 2-hexylethyl acrylate, 10 parts of vinyl acetate, 3 parts of acetoacetylated 2-hydroxyethyl methacrylate, prepared as above, and 60 parts of ethyl acetate. After initiation of refluxing, 0.07 part of azobisisobutyronitrile as a polymerization initiator was added and the reaction was conducted at the reflux temperature of ethyl acetate for 7 hours. The reaction mixture was then diluted with toluene to give a solution of acetoacetyl group-containing acrylic copolymer (A-1) in ethyl acetate-toluene.

(A-2)

The above-described production procedure for (A-1) was repeated except that the composition of the charge was changed to 50 parts of butyl acrylate, 38.5 parts of 2-ethylhexyl acrylate, 10 parts of vinyl acetate and 1.5 parts of acetoacetylated 2-hydroxyethyl methacrylate, with the other conditions being unchanged. The procedure gave a solution of acetoacetyl group-containing acrylic copolymer (A-2) in ethyl acetate-toluene.

(A-3)

The production procedure for (A-2) was repeated except that the charge of acetoacetylated 2-hydroxyethyl methacrylate was adjusted to 4.5 parts to give a solution of acetoacetyl group-containing acrylic copolymer (A-3) in ethyl acetate-toluene.

(A-4)

The production procedure for (A-1) was repeated except that 3 parts of acrylic acid was used in lieu of 3 parts of acetoacetylated 2-hydroxyethyl methacrylate. The procedure gave a solution of acrylic copolymer (A-4) in ethyl acetate-toluene.

(A-5)

The production procedure for (A-1) was repeated except that 3 parts of maleic anhydride was used in lieu of 3 parts of acetoacetylated 2-hydroxyethyl methacrylate. The procedure gave a solution of acrylic copolymer (A-5) in ethyl acetate-toluene.

Curing Component (B)

The following curing agents were provided.

(B-1) An isocyanate compound (Coronate L, Nippon Polyurethane Industry, Co., Ltd.: a 75% solution of trimethylolpropane-tolylene diisocyanate adduct in ethyl acetate)

(B-2) An epoxy compound (Epotohto YD-128, Tohto Kasei Co., Ltd.; an epoxy resin of bisphenol A-epichlorohydrin type)

(B-3) An aldehyde compound (a 5% solution of glyoxal in isopropyl alcohol)

(B-4) An non-amino resin amine compound (hexamethylenediamine)

(B-5) A metal alkoxide (a 5% solution of tetraethyl zirconate in isopropyl alcohol)

(B-6) A metal chelate compound (a 5% solution of zirconium tetracetylacetonate in isopropyl alcohol)

(B-7) A metal salt (zinc chloride)

(B-8) An ammonium salt (ammonium chloride)

(B-9) A hydrazine compound (adipic acid hydrazide)

(B-10) An amino resin (Cymel-325, Mitsui Toatsu Chemicals, Inc.; methylated melamine resin)

(B-11) An isocyanate compound (Takenate D110N, Takeda Chemical Industries, Ltd.; a 75% solution of trimethylolpropane-xylylene diisocyanate adduct in ethyl acetate)

(B-12) A non-amino resin amine compound (hexamethylenetetramine)

(B-13) A metal chelate compound (a 5% solution of zinc tetracetylacetonate in isopropyl alcohol)

Preparation of Pressure Sensitive Adhesive Compositions and Their Performances Using the formulations shown in Table 1, pressure sensitive adhesive compositions were prepared and their performances were evaluated.

The test conditions and results are also shown in Table 1. The methods for performance evaluation tests were as follows.

Pot Life

After addition of the respective curing agents, the compositions were allowed to stand in an incubator at 25° C. and the time till disappearance of fluidity was measured.

Methods of Preparation of Pressure Sensitive Adhesive Tapes, and Tests Methods Using an applicator, each pressure sensitive adhesive composition was coated on a 25 μm-thick polyester film to a dry coverage of 25 g/m² and dried at 100° C. for 1 minute to prepare a pressure sensitive adhesive tape.

The tape was allowed to stand at 25° C. for 5 days and its performance was tested.

Adhesive Strength

Tested as directed in JIS-Z-1522 (180° peeling strength, stainless steel sheet, pulling speed 300 mm/min.)

Ball Tack

Tested according to the method of J. Dow (rolling ball method)

Cohesive Strength

One end of a tape specimen measuring 25 mm wide and 60 mm long was affixed over a 25 mm × 25 mm area of a stainless steel sheet and a roll of rigid rubber weighing 2 kg was rolled in 2 reciprocations to press the tape against the steel sheet. The specimen was then allowed to remain at 40° C. or 80° C. for 30 minutes, at the end of which time a load of 1 kg was applied to the other end of the tape and the time to failure of the bond was measured.

Keying Property With Respect to Polyester Film

The pressure sensitive adhesive layer of each specimen was forcefully rubbed against with a finger and the strength of adhesion to the film was evaluated.

Corrosive Effect on Copper Sheet

Each pressure sensitive adhesive tape specimen was affixed to a copper sheet and allowed to stand in an atmosphere of 65° C. and 85% R.H. for 7 days to evaluate the corrosive effect on copper.

EXAMPLES 13 TO 19 AND COMPARATIVE EXAMPLES 6 TO 7

Synthesis of Acrylic Copolymer Component (A)

In the manner described below, an acetoacetyl group-free acrylic copolymer (A-6) and an acetoacetyl group-containing copolymer (A-7) were synthesized.

(A-6)

A four-necked round-bottomed flask fitted with a reflux condenser, stirrer, drip funnel and thermometer was charged with 50 parts of butyl acrylate, 37 parts of 2-ethylhexyl acrylate, 10 parts of vinyl acetate, 3 parts of 2-hydroxyethyl methacrylate and 60 parts of ethyl acetate. After initiation of refluxing, 0.07 part of azobisisobutyronitrile as a polymerization initiator was added. The reaction was conducted at the reflux temperature of ethyl acetate for 7 hours and the reaction mixture was diluted with toluene. The procedure gave a solution of acrylic copolymer (A-6) in ethyl acetate-toluene.

(A-7)

After completion of the polymerization reaction for (A-6), the reaction mixture was cooled to 60° C. and 0.05 part of triethylamine was added. Then, 1.93 parts of diketene was added dropwise over a period of 1 hour with constant stirring. The reaction was further conducted for 6 hours to acetoacetylate the hydroxyl groups of the copolymer. The procedure gave a solution of acetoacetylated acrylic copolymer (A-7), in which all the available hydroxyl groups had been acetoacetylated.

Preparation of Pressure Sensitive Adhesive Compositions and Their Performances Using the formulations shown in Table 2, pressure sensitive adhesive compositions were prepared and their performances were evaluated.

The results are shown in Table 2.

In the following tables, the keying property and the corrosive property for each of the examples is indicated by a symbol. In each case the symbols used have the following meanings:

⊙: excellent
∘ : good
Δ: fairly good
×: rather bad
××: bad

TABLE 1

| | Copolymer (A) | | Curing agent (B) | | Pot life | Adhesive strength (g/inch) | Ball tack | Cohesive strength (min) 40° C. | Cohesive strength (min) 80° C. | Keying property | Corrosive property (copper plate) |
|---|---|---|---|---|---|---|---|---|---|---|---|
| Example 1 | A-1 | 100 | B-1 | 0.5 | ≧24 hr | 1050 | 12 | ≧1440 | ≧1440 | ⊙ | ⊙ |
| Example 2 | A-1 | 100 | B-1 | 1.0 | ≧24 hr | 1000 | 11 | ≧1440 | ≧1440 | ∘ | ⊙ |
| Example 3 | A-1 | 100 | B-2 | 1.0 | ≧24 hr | 900 | 10 | ≧1440 | ≧1440 | ∘ | ⊙ |
| Example 4 | A-1 | 100 | B-3 | 0.2 | ≧24 hr | 1150 | 12 | ≧1440 | ≧1440 | ⊙ | ⊙ |
| Example 5 | A-1 | 100 | B-4 | 0.2 | ≧24 hr | 980 | 12 | ≧1440 | ≧1440 | ∘ | ⊙ |
| Example 6 | A-1 | 100 | B-5 | 1.0 | ≧24 hr | 1000 | 13 | ≧1440 | ≧1440 | ∘ | ⊙ |
| Example 7 | A-1 | 100 | B-6 | 1.0 | 16 hr | 900 | 12 | ≧1440 | ≧1440 | ∘ | ⊙ |
| Example 8 | A-1 | 100 | B-7 | 0.5 | 12 hr | 950 | 11 | ≧1440 | ≧1440 | ⊙ | ⊙ |
| Example 9 | A-1 | 100 | B-9 | 0.2 | 16 hr | 1000 | 12 | ≧1440 | ≧1440 | ⊙ | ⊙ |
| Comparative Example 1 | A-4 | 100 | B-1 | 1.0 | ≧24 hr | 900 | 7 | ≧1440 | 600 | ⊙ | XX |
| Comparative Example 2 | A-4 | 100 | B-5 | 1.0 | 5 hr | 700 | 8 | 900 | 200 | Δ | XX |

TABLE 1-continued

|  | Copolymer (A) |  | Curing agent (B) |  | Pot life | Adhesive strength (g/inch) | Ball tack | Cohesive strength (min) 40° C. | Cohesive strength (min) 80° C. | Keying property | Corrosive property (copper plate) |
|---|---|---|---|---|---|---|---|---|---|---|---|
| Comparative Example 3 | A-4 | 100 | B-10 | 1.0 | ≧24 hr | Cohesive failure | 12 | 6 | ≦1 | ○ | XX |
| Comparative Example 4 | A-1 | 100 | B-10 | 1.0 | 2 hr | 900 | 12 | ≧1440 | ≧1440 | X | ⊙ |
| Comparative Example 5 | A-5 | 100 | B-10 | 1.0 | ≧24 hr | 1000 | 10 | 150 | 5 | ○ | XX |
| Example 10 | A-1 | 70 | B-4 | 0.2 | ≧24 hr | 900 | 10 | ≧1440 | ≧1440 | ○ | Δ |
|  | A-4 | 30 |  |  |  |  |  |  |  |  |  |
| Example 11 | A-2 | 100 | B-4 | 0.2 | ≧24 hr | 1200 | 13 | ≧1440 | ≧1440 | ⊙ | ⊙ |
| Example 12 | A-3 | 100 | B-4 | 0.2 | 20 hr | 900 | 12 | ≧1440 | ≧1440 | ○ | ⊙ |

[Notes]
1. Of each of Copolymer (A) and Curing agent (B) columns, the left and right segments represent the kind and amount (in parts), respectively, of the corresponding material.
2. After addition of copolymer (A) and curing agent (B), the percentage of the resin is 40 ± 1% and the viscosity of the composition is 2,900–5,600 cps/25° C.

TABLE 2

|  | Copolymer (A) |  | Curing agent (B) |  | Pot life | Adhesive strength (g/inch) | Ball tack | Cohesive strength (min) 40° C. | Cohesive strength (min) 80° C. | Keying property | Corrosive property (copper plate) |
|---|---|---|---|---|---|---|---|---|---|---|---|
| Example 13 | A-7 | 100 | B-4 | 0.2 | ≧24 hr | 1100 | 12 | ≧1440 | ≧1440 | ○ | ⊙ |
| Example 14 | A-7 | 60 | B-4 | 0.2 | ≧24 hr | 900 | 10 | ≧1440 | ≧1440 | ○ | ⊙ |
|  | A-6 | 40 |  |  |  |  |  |  |  |  |  |
| Example 15 | A-7 | 100 | B-6 | 1.0 | ≧24 hr | 980 | 12 | ≧1440 | ≧1440 | ○ | ⊙ |
| Example 16 | A-1 | 100 | B-11 | 1.0 | ≧24 hr | 1050 | 12 | ≧1440 | ≧1440 | ⊙ | ⊙ |
| Example 17 | A-1 | 100 | B-12 | 0.2 | ≧24 hr | 1150 | 12 | ≧1440 | ≧1440 | ○ | ⊙ |
| Example 18 | A-1 | 100 | B-13 | 1.0 | ≧24 hr | 1000 | 13 | ≧1440 | ≧1440 | ○ | ⊙ |
| Example 19 | A-1 | 100 | B-8 | 0.5 | ≧24 hr | 900 | 12 | ≧1440 | ≧1440 | ○ | ⊙ |
| Comparative Example 6 | A-6 | 100 | B-4 | 0.2 | ≧24 hr | Cohesive failure | 13 | 5 | ≦1 | ○ | ⊙ |
| Comparative Example 7 | A-6 | 100 | B-6 | 1.0 | ≧24 hr | Cohesive failure | 13 | 7 | ≦1 | ○ | ⊙ |

1. Of each of Copolymer (A) and Curing agent (B) columns, the left and right segments represent the kind and amount (in parts), respectively, of the corresponding material.
2. After addition of copolymer (A) and curing agent (B), the percentage of the resin is 40 ± 1% and the viscosity of the composition is 2,900–5,600 cps/25° C.

What is claimed is:

1. A curable pressure sensitive adhesive composition comprising, (A) an acrylic copolymer component containing an acetoacetyl group, and (B) a curing component selected from the group consisting of isocyanate compounds, epoxy compounds, aldehyde compounds, non-amino resin amine compounds, metal salts, metal alkoxides, metal chelate compounds, ammonium salts and hydrazine compounds, said composition having an adhesive strength of at least 900 g/inch.

2. A curable pressure sensitive adhesive composition according to claim 1 wherein the acetoacetyl group content of said acetoacetyl group-containing acrylic copolymer is 0.01 to 40 weight percent and the acetoacetyl group content of the whole acrylic copolymer component (A) is 0.01 to 20 weight percent.

3. A curable pressure sensitive adhesive composition according to claim 1 wherein the proportion of the acetoacetyl group-containing acrylic copolymer relative to the whole acrylic copolymer component (A) is not less than 10 weight percent.

4. A pressure sensitive adhesive composition according to claim 1 wherein the acetoacetyl group content of said acetoacetyl group-containing acrylic copolymer is 0.01 to 40 weight percent and the acetoacetyl group content of the whole acrylic copolymer component (A) is 0.01 to 20 weight percent.

5. A pressure sensitive adhesive composition according to claim 1 wherein the proportion of the acetoacetyl group-containing acrylic copolymer relative to the whole acrylic copolymer component (A) is not less than 10 weight percent.

6. A pressure sensitive adhesive composition according to claim 1 wherein the proportion of said curing component (B) relative to said acrylic copolymer component (A) is 0.001 to 10 weight percent.

* * * * *